United States Patent
Fan et al.

(10) Patent No.: US 10,103,586 B2
(45) Date of Patent: Oct. 16, 2018

(54) PERMANENT MAGNET MOTOR, REFRIGERATION COMPRESSOR AND AIR CONDITIONING UNIT

(71) Applicant: Gree Electric Appliances, Inc. of Zhuhai, Zhuhai, Guangdong (CN)

(72) Inventors: Zhao Fan, Guangdong (CN); Yabin Ding, Guangdong (CN); Ying Chen, Guangdong (CN); Huaican Liu, Guangdong (CN)

(73) Assignee: GREE ELECTRIC APPLIANCES, INC. OF ZHUHAI (CN)

( * ) Notice: Subject to any disclaimer, the term of this patent is extended or adjusted under 35 U.S.C. 154(b) by 354 days.

(21) Appl. No.: 14/912,032

(22) PCT Filed: Aug. 1, 2014

(86) PCT No.: PCT/CN2014/083551
§ 371 (c)(1),
(2) Date: Feb. 12, 2016

(87) PCT Pub. No.: WO2015/021870
PCT Pub. Date: Feb. 19, 2015

(65) Prior Publication Data
US 2016/0197526 A1 Jul. 7, 2016

(30) Foreign Application Priority Data

Aug. 13, 2013 (CN) .......................... 2013 1 0352017

(51) Int. Cl.
*H02K 1/20* (2006.01)
*F04C 18/10* (2006.01)
(Continued)

(52) U.S. Cl.
CPC ............... *H02K 1/20* (2013.01); *F04C 18/10* (2013.01); *F04D 25/06* (2013.01); *F25B 31/006* (2013.01); *F25B 31/02* (2013.01); *H02K 2213/03* (2013.01)

(58) Field of Classification Search
CPC .. H02K 1/20; H02K 1/22; H02K 1/27; H02K 1/2706; F04D 25/06; F25B 31/006; F25B 31/02
See application file for complete search history.

(56) References Cited

U.S. PATENT DOCUMENTS 3,675,056 A 7/1972 Lenz
2003/0062780 A1* 4/2003 Kaneko .................. H02K 1/20
310/58
(Continued)

FOREIGN PATENT DOCUMENTS

| CN | 203406692 | 1/2014 |
| CN | 203554093 | 4/2014 |

(Continued)

*Primary Examiner* — Elizabeth Martin
(74) *Attorney, Agent, or Firm* — Colin P. Cahoon; Shaukat A. Karjeker; Carstens & Cahoon, LLP

(57) ABSTRACT

A stator and a rotor are mounted inside a case of the permanent magnet motor, and separate the inner cavity of the case into a first inner cavity and a second inner cavity. Axial ventilation holes in communication with the first inner cavity and with the second inner cavity, are disposed in teeth of a stator core of the stator, and each axial ventilation hole is a taper hole extending in a height direction of each tooth. The width of one end of the axial ventilation hole, which is close to a head of the tooth, is greater than the width of the other end of the axial ventilation hole, which is close to a root of the tooth. The taper holes enable fluid to fully carry out exchange heat at the teeth where heat is generated most intensively.

9 Claims, 4 Drawing Sheets

(51) Int. Cl.
  *F04D 25/06* (2006.01)
  *F25B 31/00* (2006.01)
  *F25B 31/02* (2006.01)

(56) References Cited

U.S. PATENT DOCUMENTS

2008/0111435 A1* 5/2008 Maeda ................. H02K 1/2733
                                                    310/156.28
2013/0230382 A1* 9/2013 De Larminat ........ F04D 25/082
                                                    415/1

FOREIGN PATENT DOCUMENTS

| | | |
|---|---|---|
| DE | 1090750 | 10/1960 |
| DE | 2512190 | 9/1976 |
| JP | 58-40898 | 9/1983 |
| JP | 2006074866 | 3/2006 |
| WO | 2012/082592 | 6/2012 |

* cited by examiner

PERMANENT MAGNET MOTOR, REFRIGERATION COMPRESSOR AND AIR CONDITIONING UNIT

CROSS REFERENCE TO RELATED APPLICATIONS

This application is a continuation application of PCT Patent Application No. PCT/CN2014/083551, entitled "Permanent Magnet Motor, Refrigeration Compressor and Air Conditioning Unit", filed on Aug. 1, 2014, which claims priority to Chinese Patent Application No. 201310352017.9, entitled "Permanent Magnet Motor, Refrigeration Compressor and Air Conditioning Unit", filed on Aug. 13, 2013, the entire contents of which are incorporated herein by reference.

TECHNICAL FIELD

The present disclosure relates to a motor, more particularly, to a permanent magnet motor, a refrigeration compressor having the permanent magnet motor and an air conditioning unit having the compressor.

BACKGROUND

When the permanent magnet motor operates, the highest temperature and the heat are mainly caused by copper loss and iron loss of the stator. Flux density in the teeth of the stator is the largest, and thus the loss is larger, causing the temperature highest at the inner surface of the stator and at the outer surface of the rotor of the motor. It is found through experiments and studies that, as the rotor is constructed by a permanent magnet, the heat caused by the rotor can be ignored. Therefore, during the operation of the motor, the rise of the temperature of the rotor is mainly caused by heat transmission. As for a permanent magnet motor, if the temperature of the rotor is too high, the motor will have hidden dangers, such as, the rotor being demagnetized, heat loss due to the insulation of the motor, and so on.

In a permanent magnet motor for a refrigeration compressor, cooling is usually done through spraying coolants or providing a spiral flow channel between the stator and the case. In practical applications, these manners of cooling have following problems: the effect of cooling the rotor of the motor is poor; the thermal field inside the motor is not uniform, that is, the temperature is too high at some regions but is too low at some other regions.

SUMMARY OF THE INVENTION

In view of the situations in the prior art, one objective of the present disclosure is to provide a permanent magnet motor, which can increase the heat exchange efficiency of the motor and enable the heat-exchange fluid such as refrigerants to carry out heat-exchange at the teeth, where heat is generated most intensively, thereby controlling the temperature of the motor stably and solving the problem of uneven cooling of the permanent magnet motor. Another objective of the present disclosure is to provide a refrigeration compressor having the permanent magnet motor and an air conditioning unit having the refrigeration compressor.

In order to solve the technical problems above, the present disclosure provides a permanent magnet motor, comprising a case, a stator and a rotor; the stator and the rotor are installed in the case, and separate an inner cavity of the case into a first inner cavity and a second inner cavity; the stator comprises a stator core, axial ventilation holes in communication with the first inner cavity and with the second inner cavity are disposed in teeth of the stator core; wherein, each axial ventilation hole is a taper hole extending in a height direction of each tooth; width of one end of the axial ventilation hole, which is close to a head of the tooth, is greater than width of the other end of the axial ventilation hole, which is close to a root of the tooth.

In one of the embodiments, contour lines of a cross-section of the axial ventilation hole comprises a first contour line, which is arc-shaped and close to the head of the tooth, and a second contour line, which is arc-shaped and close to the root of the tooth, and third contour lines, which are straight line-shaped and each of which is connected with the first contour line at one end and connected with the second contour line at the other end.

In one of the embodiments, a radius R1 of the first contour line is no greater than one third of width L2 of the tooth.

In one of the embodiments, a distance L from a center point $O_1$ of the first contour line to an inner circle surface of the stator is greater than 0.5 mm.

In one of the embodiments, a distance L1 between a center point $O_1$ of the first contour line to a center point $O_2$ of the second contour line is greater than or equal to a radius R1 of the first contour line.

In one of the embodiments, a radius R2 of the second contour line is no greater than one third of a radius R1 of the first contour line.

In one of the embodiments, the rotor comprises a rotor core and rotor pressing rings arranged axially at both sides of the rotor core; a partition is provided between the rotor core and at least one rotor pressing ring; an outer edge of the partition extends into an air gap, said air gap is formed between an inner circle surface of the stator and an outer circle surface of the rotor.

In one of the embodiments, the partition is annular-shaped, and an outer diameter of the partition is greater than a diameter of the outer circle surface of the rotor, and less than a diameter of the inner circle surface of the stator.

In one of the embodiments, the case is provided with a fluid inlet and a fluid outlet; the fluid inlet communicates with the first inner cavity, and the fluid outlet communicates with the second inner cavity.

The present invention provides a refrigeration compressor, which comprises a motor, the motor is the permanent magnet motor described above.

In one of the embodiments, the refrigeration compressor is a centrifugal refrigeration compressor or a screw-type refrigeration compressor.

The present invention provides an air conditioning unit, comprising a compressor, a condenser, throttling elements in a main pipeline, and an evaporator; the compressor, the condenser, the throttling elements in the main pipeline, and the evaporator are connected through pipes to form a circulation loop of refrigeration; the compressor is the refrigeration compressor described above; the fluid inlet communicates with a liquid outlet of the condenser through the throttling elements in the main pipeline; and the fluid outlet communicates with a gas intake port of the compressor.

In one of the embodiments, the air conditioning unit further comprises a flash evaporator, the flash evaporator is connected between the condenser and the evaporator; or the fluid inlet communicates with a liquid outlet of the condenser through the throttling elements in the main pipeline.

In the permanent magnet motor provided by the present disclosure, as the axial ventilation hole disposed in the tooth of the stator core is a taper hole extending in the height direction of the tooth, the axial ventilation hole enables the heat-exchange fluid to carry out heat exchange at the tooth, where heat is generated most intensively, thereby controlling the temperature of the motor stably, solving the problem of uneven cooling of the permanent magnet motor and keeping a constant thermal field inside the motor. What's more, as the axial ventilation hole is a taper hole, the residual paint left during the dip painting process gathers at the narrower end of the ventilation hole under the action of the surface tensions while the wider end of the ventilation hole keeps open, which ensures that the axial ventilation hole will not be blocked when the motor is being dip painted.

The beneficial effects of the additional features of the present disclosure will be described in more details in the "detailed description of the preferred embodiments".

In the figures: 10. case; 10a. first inner cavity; 10b. second inner cavity; 10c. air gap; 20. stator; 21. stator core; 211. yoke; 212. tooth; 212a. head; 212b. root; 213. axial ventilation hole; 213a. first contour line; 213b. second contour line; 213c. third contour line; 22. coil winding; 23. inner circle surface of the stator; 30. rotor; 31. rotor core; 32. rotor pressing ring; 33. partition; 33a. outer edge of the partition; 34. revolving shaft; 35. outer circle surface of the stator.

DETAILED DESCRIPTION OF THE PREFERRED EMBODIMENTS

The present disclosure will be described in more details with reference to the accompanying figures and embodiments. It should be noted that various embodiments and the features thereof can be combined with each other under the condition of no conflict.

Figure 1:
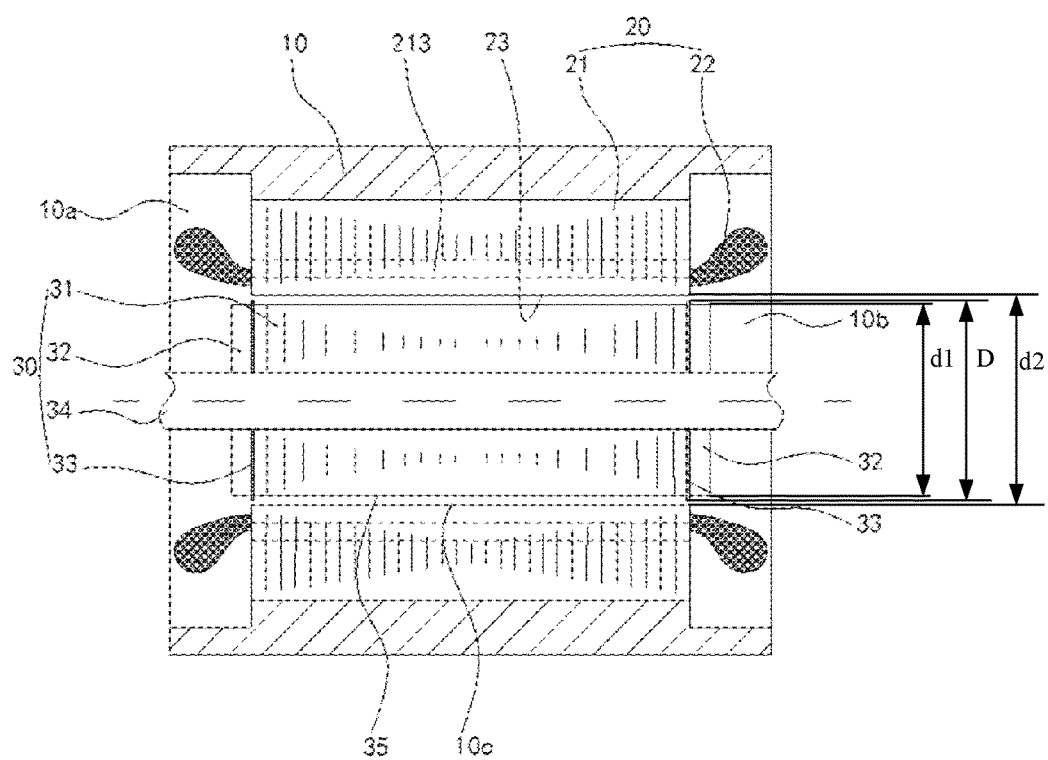
FIG. 1 is a schematic sectional diagram illustrating the permanent magnet motor according to one embodiment of the present invention.

In one embodiment of the present invention, a permanent magnet motor is provided. As shown in FIG. 1, the permanent magnet motor includes a case 10, a stator 20 and a rotor 30. The stator 20 is installed fixedly inside the case 10. The stator includes a stator core 21 and coil windings 22. The rotor 30 is installed inside the stator core 21. The stator 20 and the rotor 30 separate the inner cavity of the case 10 into a first inner cavity on the left and a second inner cavity on the right, and an air gap 10c is formed between the inner circle surface 23 of the stator and the outer circle surface 35 of the rotor. The rotor 30 includes a revolving shaft 34, a rotor core 31 installed on the revolving shaft 34, and rotor pressing rings 32 arranged axially at both sides of the rotor core 31.

Figure 2:
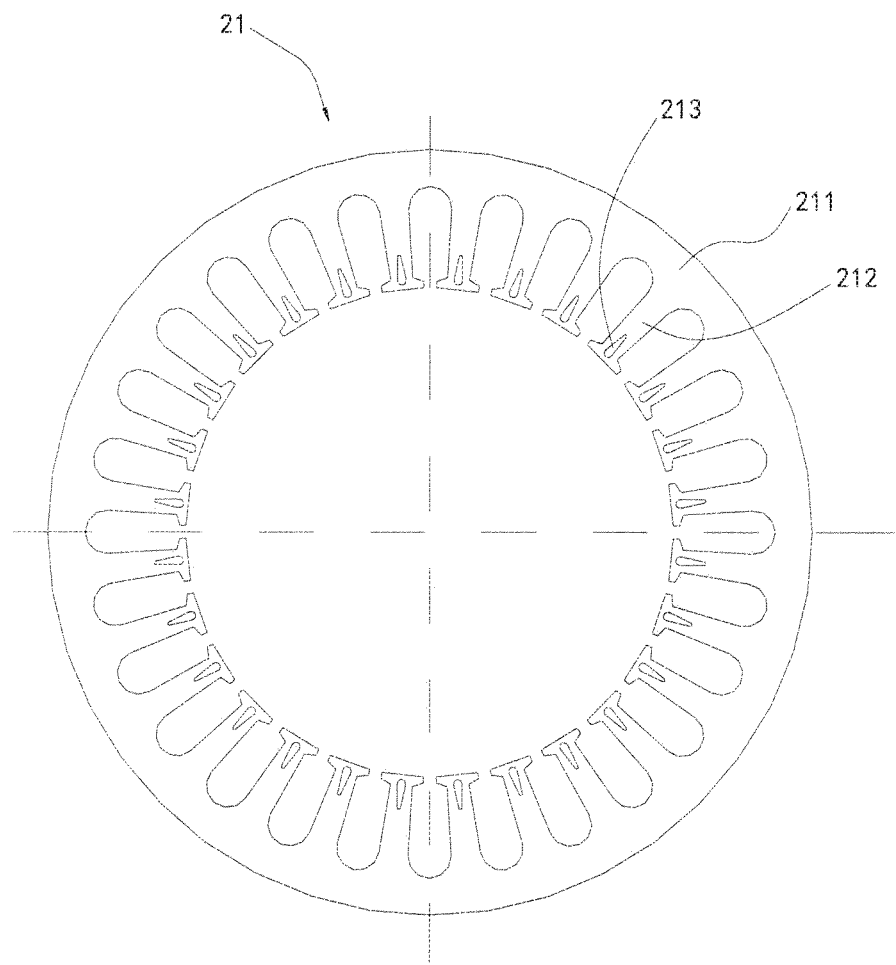
FIG. 2 is a structural schematic diagram illustrating the stator core of the permanent magnet motor shown in FIG. 1.
Figure 3:
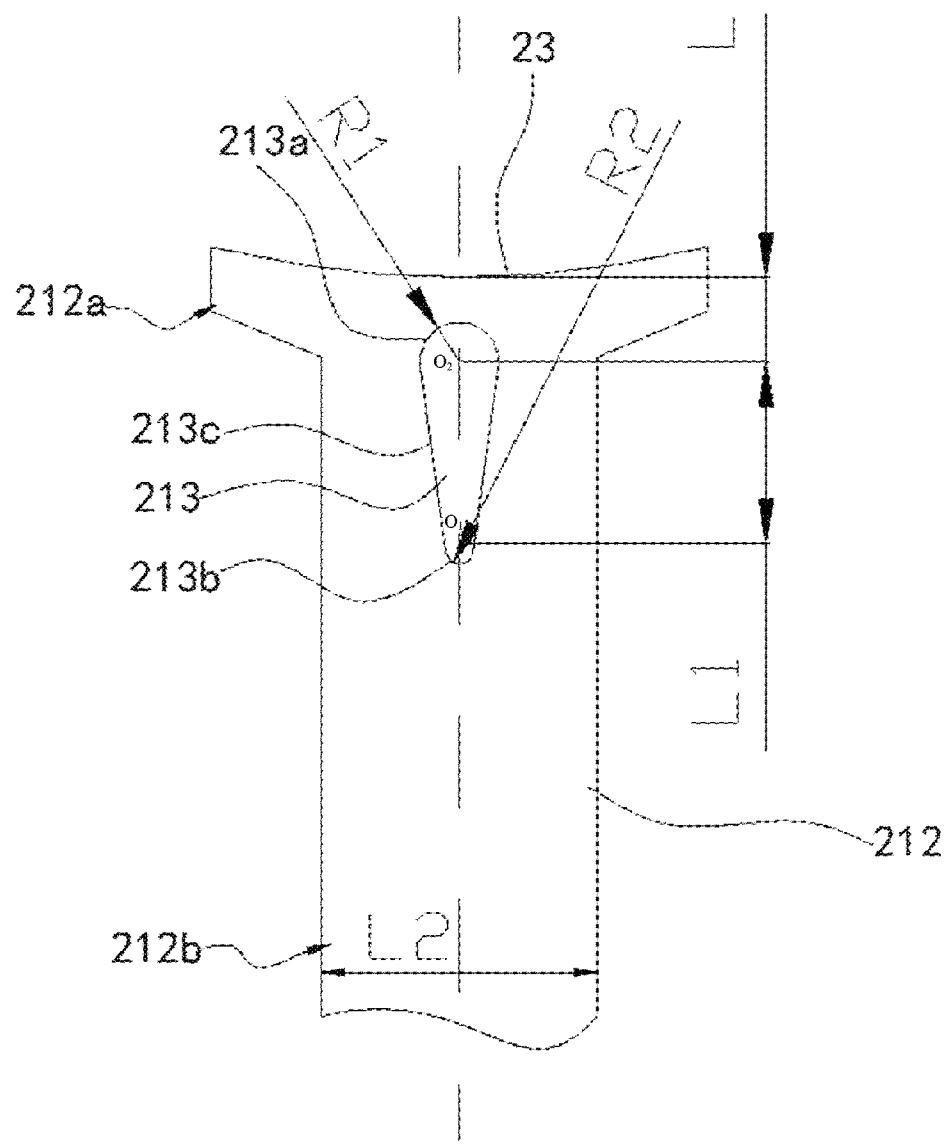
FIG. 3 is an enlarged partial schematic diagram illustrating the stator core of the permanent magnet motor shown in FIG. 1.

As shown in FIGS. 2 and 3, the stator core 21 has a yoke 211 and multiple teeth 212 extending radially and inwardly. An axial ventilation hole 213 is disposed in each tooth 212 of the stator core 21 to communicate with the first inner cavity 10a and with the second inner cavity 10b. The axial ventilation hole 213 is a taper hole extending in the height direction of the tooth. The width of one end of the axial ventilation hole 213, which is close to a head 212a of the tooth 212, is greater than the width of the other end of the axial ventilation hole, which is close to a root 212b of the tooth 212. Heat is taken away from the teeth 212 by the heat-exchange fluid (such as air or refrigerant) through the axial ventilation holes 213. As the axial ventilation hole 213 is taper-shaped, the teeth 212 fully contact with the heat-exchange fluid, thereby increasing the heat exchange efficiency of the motor, stably controlling the temperature of the motor and solving the problem of uneven cooling of the permanent magnet motor. Furthermore, as the axial ventilation hole 213 is taper-shaped, the residual paint left during the dip painting process gathers at the narrower end of the ventilation hole under the action of the surface tensions while the wider end of the ventilation hole 213 keeps open, which ensures that the axial ventilation hole 213 will not be blocked when the motor is being dip painted.

Preferably, contour lines of a cross-section of the axial ventilation hole 213 comprise a first contour line 213a, which is arc-shaped and close to the head 212a of the tooth 212, and a second contour line 213b, which is arc-shaped and close to the root 212b of the tooth 212, and third contour lines, which are straight line-shaped and each of which is connected with the first contour line 213a at one end and connected with the second contour line 213b at the other end. The contour lines of the cross-section of the axial ventilation hole 213 are connected with one another via circular arc transition, which, on one hand, retains the strength of the tooth 212, and on the other hand, prevents electric charges from accumulating at sharp corners.

Preferably, a radius R1 of the first contour line 213a is no greater than one third of the width L2 of the tooth, so as to retain the strength of the tooth 212 of the stator core 21.

Preferably, the distance L from the center point $O_1$ of the first contour line 213a to the inner circle surface 23 of the stator 20, is greater than 0.5 mm, so as to enable the axial ventilation hole 213 to be close to the air gap to the greatest extent.

Preferably, the distance L1 between the center point $O_1$ of the first contour line 213a to the center point $O_2$ of the second contour line 213b, is greater than or equal to the radius R1 of the first contour line 213a, so as to enable the axial ventilation hole 213 to keep taper-shaped to the greatest extent.

Preferably, a radius R2 of the second contour line 213b is no greater than one third of the radius R1 of the first contour line 213a, so as to ensure that, when the motor is being dip painted, the paint gathers at the narrower end of the ventilation hole under the action of the surface tensions, not to block the axial ventilation hole 213.

Figure 4:
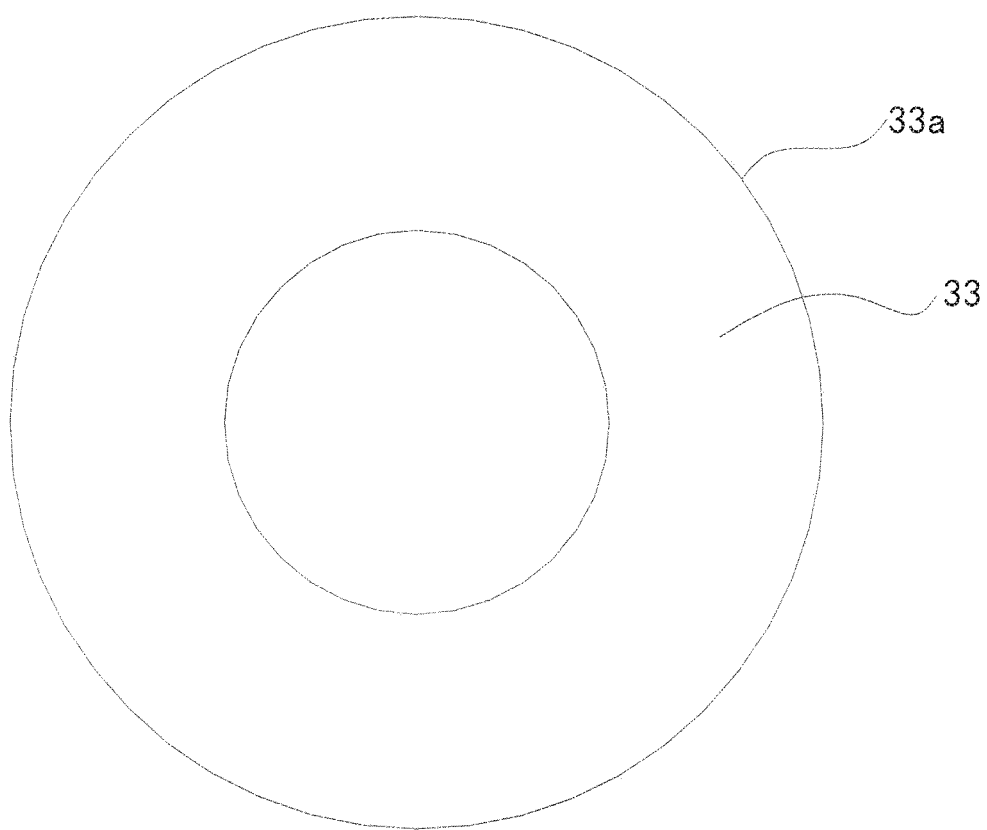
FIG. 4 is a structural schematic diagram illustrating the partition of the permanent magnet motor shown in FIG. 1.

Preferably, the rotor 30 includes a rotor core 31 and rotor pressing rings 32 arranged axially at both sides of the rotor core 31. A partition (shown in FIGS. 1 and 4) is provided between the rotor core 31 and one rotor pressing ring 32 or is provided between the rotor core 31 and each of the rotor pressing rings 32. The outer edge 33a of the partition 33 extends into the air gap 10c. Air-resistance is formed in the air gap 10c when the rotor 30 rotates at high speed, and the outer edge 33a of the partition 33 extends into the air gap 10c, thus the air resistance effect is enhanced, which helps to prevent more heat-exchange fluid from entering the air gap 10c so as to make the axial ventilation holes 213 the only channel of the whole loop, thereby reducing the amount of the heat-exchange fluid required for cooling the motor and realizing the largest cooling efficiency, what's more, the air frictional loss is reduced.

As shown in FIG. 2, the partition 33 is annular-shaped, the outer diameter of the partition 33 is greater than the diameter of the outer circle surface 35 of the rotor 30, and less than the diameter of the inner circle surface 23 of the stator 20.

Preferably, the partition 33 is made of thermal insulation material. When the heat-exchange fluid (such as air or refrigerant) flows into the first inner cavity, a cold surface is formed on the rotor pressing ring 32, and condensation effect occurs on the surface of the rotor pressing ring 32. As the rotor 30 rotates at high speed, the condensate refrigerant is thrown to the end of the coil winding 22, cooling the end of the coil winding 22. Preferably, grooves or protuberances (not shown in Figures) are disposed on the surface of the rotor pressing ring 32, said surface is opposite to the partition 33, so as to realize better effect of condensation and better effect of carrying liquid.

Preferably, the partition 33 is made of insulation material. The insulation material is magnetically non-conductive, it will not be magnetized and will not change the magnetic field in the motor, and thus it will not cause additional loss.

Preferably, the case 10 is provided with a fluid inlet (not shown) and a fluid outlet (not shown). The fluid inlet communicates with the first inner cavity 10a, and the fluid outlet communicates with the second inner cavity 10b. When the motor operates, the fluid heat-exchange fluid (preferably, liquid refrigerant) enters the first inner cavity 10a through the fluid inlet, then carries out heat-exchange when it goes through the axial ventilation hole 213, during this process, the heat-exchange fluid absorbs heat to experience phase transition, takes heat away through the phase transition, further increasing the heat exchange efficiency of the motor.

In a second embodiment of the present invention, a refrigeration compressor is provided. The refrigeration compressor includes a motor, said motor is the permanent magnet motor described in the embodiments above. The case 10 is provided with a refrigerant inlet (not shown in figures) in communication with the first inner cavity 10a, and provided with a refrigerant outlet (not shown) in communication with the second inner cavity 10b. In this way, the heat-exchange fluid enters the first inner cavity 10a through the refrigerant inlet; and exchanges heat with the teeth 212 when it goes through the axial ventilation holes 213; then flows into the second inner cavity 10b; finally, the heat-exchange fluid is discharged from the refrigerant outlet. Thus, the refrigerant inside the motor circulates in an independent circulation system under the action of the compressor. Preferably, the refrigeration compressor is a centrifugal refrigeration compressor or a screw-type refrigeration compressor.

In a third embodiment of the present invention, an air conditioning unit (not shown) is provided. The air conditioning unit includes a compressor, a condenser, throttling elements in the main pipeline, a flash evaporator and an evaporator. The compressor, the condenser, the throttling elements in the main pipeline, the flash evaporator and the evaporator are connected through pipes to form a circulation loop of refrigeration. The compressor is the refrigeration compressor described above. The refrigerant inlet communicates with the liquid outlet of the condenser through the throttling elements in the main pipeline or communicates with the liquid outlet of the flash evaporator through the throttling elements in the main pipeline. The refrigeration outlet communicates with the gas intake port of the compressor. After the liquid refrigerant goes through the throttling elements arranged in the branch pipeline, the liquid refrigerant turns into low temperature fog refrigerant and is sprayed into the first inner cavity 10a. Part of the low temperature fog refrigerant exchanges heat with the teeth 212 directly through the axial ventilation hole 213, and takes away the heat of the stator. When the motor operates, the heat is mainly caused by copper loss and iron loss of the stator; as the rotor 30 is constructed by a permanent magnet, the heat caused by the rotor 30 can be ignored. Therefore, when the permanent magnet motor operates, the rise of the temperature of the rotor 30 is mainly caused by heat transmission. According to this embodiment, heat from the stator of the permanent magnet motor is directly exchanged, thereby making the thermal field inside the permanent magnet motor uniform, eliminating the hidden dangers such as, the permanent magnet rotor being demagnetized due to high temperature, heat loss due to the insulation of the permanent magnet motor. Another part of the low temperature fog refrigerant is condensed into liquid on the surface of the rotor pressing ring 32. As the rotor 30 rotates at high speed, the condensate refrigerant is thrown to the end of the coil winding 22, cooling the end of the coil winding 22.

What described above are several embodiments of the present invention, and they are specific and in details, but not intended to limit the scope of the present invention. It will be understood by those skilled in the art that various modifications and improvements can be made without departing from the conception of the present invention, and all these modifications and improvements are within the scope of the present invention.

What is claimed is:

1. A permanent magnet motor, comprising a case, a stator and a rotor; the stator and the rotor are installed in the case, and separate an inner cavity of the case into a first inner cavity and a second inner cavity; the stator comprises a stator core, axial ventilation holes in communication with the first inner cavity and with the second inner cavity are disposed in teeth of the stator core; wherein, each axial ventilation hole is a taper hole extending in a height direction of each tooth; width of one end of the axial ventilation hole, which is close to a head of the tooth, is greater than width of the other end of the axial ventilation hole, which is close to a root of the tooth;

the rotor comprises a rotor core and rotor pressing rings arranged axially at both sides of the rotor core; a baffle is provided between the rotor core and at least one rotor pressing ring; an outer edge of the baffle extends into an air gap, said air gap is formed between an inner circle surface of the stator and an outer circle surface of the rotor.

2. The permanent magnet motor according to claim 1, wherein, contour lines of a cross-section of the axial ventilation hole comprises a first contour line, which is arc-shaped and close to the head of the tooth, and a second contour line, which is arc-shaped and close to the root of the tooth, and third contour lines, which are straight line-shaped and each of which is connected with the first contour line at one end and connected with the second contour line at the other end.

3. The permanent magnet motor according to claim 2, wherein, a radius R1 of the first contour line is no greater than one third of width L2 of the tooth.

4. The permanent magnet motor according to claim 2, wherein, a distance L from a center point $O_1$ of the first contour line to an inner circle surface of the stator is greater than 0.5 mm.

5. The permanent magnet motor according to claim 2, wherein, a distance L1 between a center point $O_1$ of the first contour line to a center point $O_2$ of the second contour line is greater than or equal to a radius R1 of the first contour line.

6. The permanent magnet motor according to claim 2, wherein, a radius R2 of the second contour line is no greater than one third of a radius R1 of the first contour line.

7. The permanent magnet motor according to claim 2, wherein, the case is provided with a fluid inlet and a fluid outlet; the fluid inlet communicates with the first inner cavity, and the fluid outlet communicates with the second inner cavity.

8. The permanent magnet motor according to claim 1, wherein, the baffle is annular-shaped, and an outer diameter of the baffle is greater than a diameter of the outer circle surface of the rotor, and less than a diameter of the inner circle surface of the stator.

9. The permanent magnet motor according to claim 1, wherein, the case is provided with a fluid inlet and a fluid outlet; the fluid inlet communicates with the first inner cavity, and the fluid outlet communicates with the second inner cavity.

\* \* \* \* \*